(12) United States Patent
Nishinami et al.

(10) Patent No.: US 12,218,353 B2
(45) Date of Patent: Feb. 4, 2025

(54) CARBONACEOUS MATERIAL, METHOD FOR PRODUCING SAME, ELECTRODE ACTIVE MATERIAL FOR ELECTROCHEMICAL DEVICE, ELECTRODE FOR ELECTROCHEMICAL DEVICE, AND ELECTROCHEMICAL DEVICE

(71) Applicant: KURARAY CO., LTD., Kurashiki (JP)

(72) Inventors: Hiroyuki Nishinami, Bizen (JP); Yumika Nishita, Bizen (JP); Shushi Nishimura, Bizen (JP)

(73) Assignee: KURARAY CO., LTD., Kurashiki (JP)

(*) Notice: Subject to any disclaimer, the term of this patent is extended or adjusted under 35 U.S.C. 154(b) by 467 days.

(21) Appl. No.: 17/627,825

(22) PCT Filed: Jul. 14, 2020

(86) PCT No.: PCT/JP2020/027355
§ 371 (c)(1),
(2) Date: Jan. 18, 2022

(87) PCT Pub. No.: WO2021/015054
PCT Pub. Date: Jan. 28, 2021

(65) Prior Publication Data
US 2022/0278327 A1 Sep. 1, 2022

(30) Foreign Application Priority Data
Jul. 19, 2019 (JP) .................................. 2019-134084

(51) Int. Cl.
*H01M 4/583* (2010.01)
*H01G 4/008* (2006.01)
(Continued)

(52) U.S. Cl.
CPC ............ *H01M 4/583* (2013.01); *H01G 4/008* (2013.01); *H01M 4/0471* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2010/0255377 A1 | 10/2010 | Tsubata et al. | |
| 2016/0300666 A1 | 10/2016 | Kamijo et al. | |

(Continued)

FOREIGN PATENT DOCUMENTS

| | | |
|---|---|---|
| CN | 108604504 A | 9/2018 |
| CN | 109923633 A | 6/2019 |

(Continued)

OTHER PUBLICATIONS

Okada et al, JP 2015-225876, English Translation from J-PlatPat (Year: 2015).*

(Continued)

*Primary Examiner* — Colin W. Slifka
(74) *Attorney, Agent, or Firm* — Element IP, PLC

(57) ABSTRACT

An object of the present invention is to provide a carbonaceous material from which an electrochemical device having a high initial electrostatic capacitance, an excellent effect of suppressing gas generation during charging and discharging, and excellent durability can be obtained, and a method for producing the carbonaceous material, an electrode active material for an electrochemical device containing the carbonaceous material, an electrode for an electrochemical device containing the electrode active material, and an electrochemical device. The present invention relates to a carbonaceous material having a BET specific surface area of 1550 to 2500 m²/g, a value of an oxygen content/hydrogen (Continued)

content per specific surface area of 1.00 to 2.10 mg/m$^2$, and an electrical conductivity of 10 to 15 S/cm determined by powder resistance measurement at a load of 12 kN.

9 Claims, 3 Drawing Sheets

(51) Int. Cl.
*H01M 4/02* (2006.01)
*H01M 4/04* (2006.01)

(56) References Cited

U.S. PATENT DOCUMENTS

| | | |
|---|---|---|
| 2020/0048099 A1 | 2/2020 | Lou et al. |
| 2021/0050160 A1 | 2/2021 | Ishida et al. |

FOREIGN PATENT DOCUMENTS

| | | | |
|---|---|---|---|
| EP | 3076416 | A1 | 10/2016 |
| EP | 3392897 | A1 | 10/2018 |
| JP | H09-192485 | A | 7/1997 |
| JP | 2007221108 | A | 8/2007 |
| JP | 2011011935 | A | 1/2011 |
| JP | 2015225876 | A * | 12/2015 |
| JP | 2017147338 | A | 8/2017 |
| WO | WO-2008053919 | A1 | 5/2008 |
| WO | WO-2009063966 | A1 | 5/2009 |
| WO | WO-2018186747 | A | 10/2018 |
| WO | WO-2018207769 | A1 | 11/2018 |

OTHER PUBLICATIONS

English translation of the International Preliminary Report on Patentability and Written Opinion issued Feb. 3, 2022 in PCT/JP2020/027355, 6 pages.
International Search Report issued Oct. 6, 2020 in PCT/JP2020/027355, 3 pages.
Extended European Search Report issued Jul. 27, 2023 in Patent Application No. 20843536.2, 7 pages.

* cited by examiner

[FIG. 1]
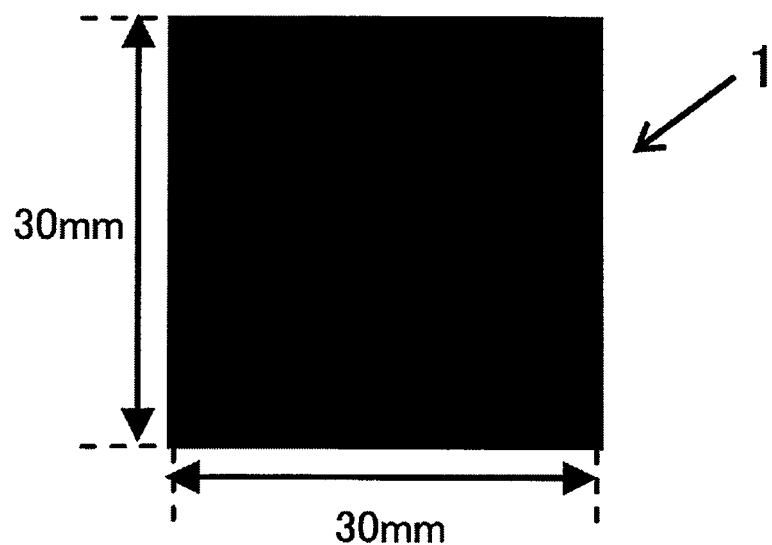
[FIG. 2]
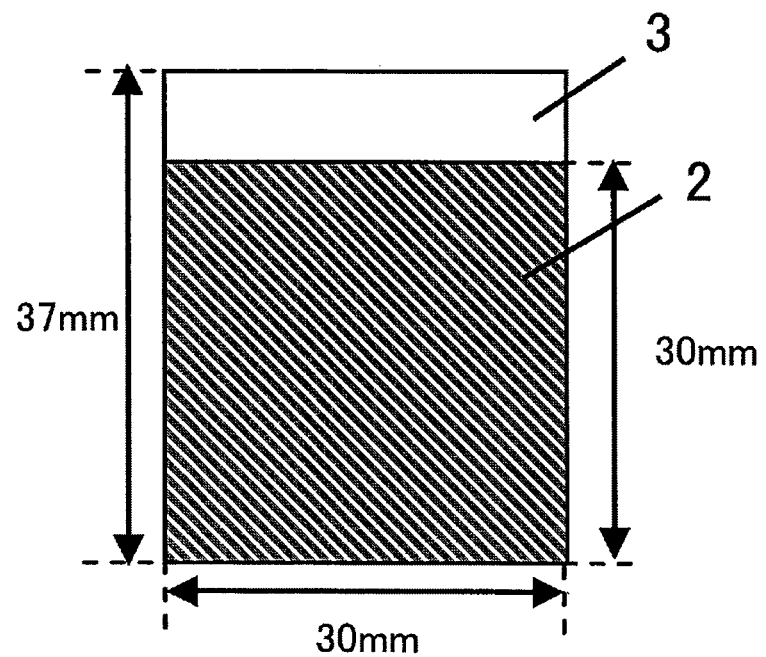

[FIG. 3]
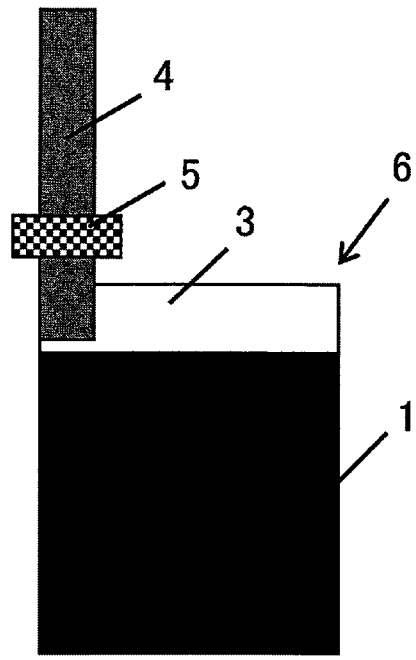
[FIG. 4]
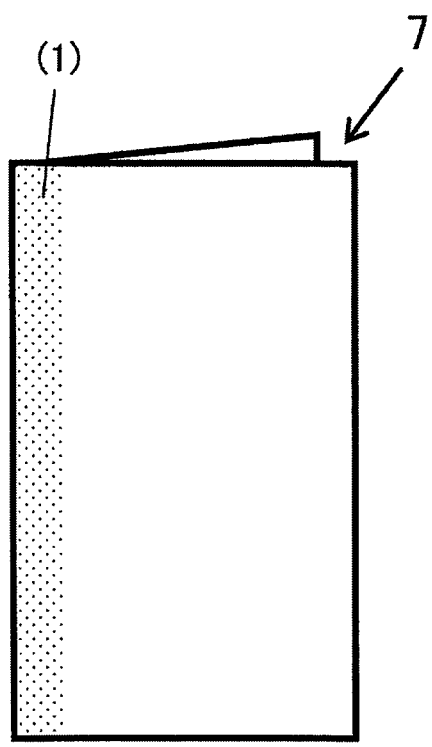

[FIG. 5]
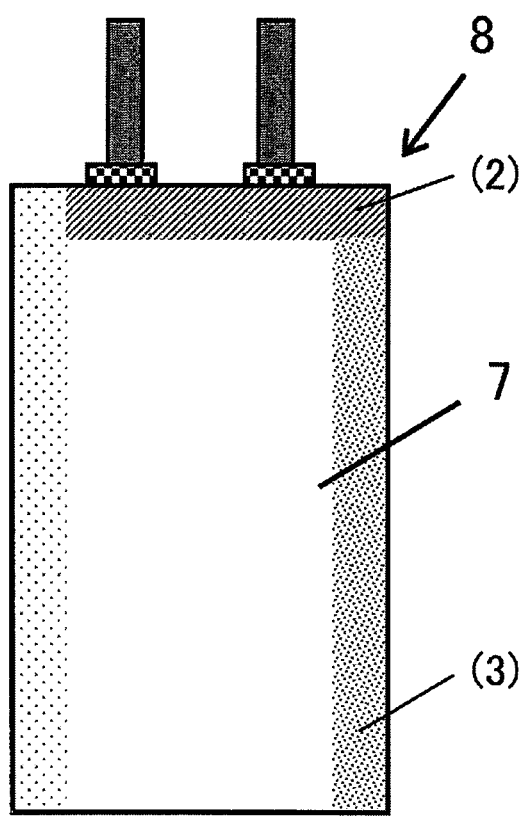

CARBONACEOUS MATERIAL, METHOD FOR PRODUCING SAME, ELECTRODE ACTIVE MATERIAL FOR ELECTROCHEMICAL DEVICE, ELECTRODE FOR ELECTROCHEMICAL DEVICE, AND ELECTROCHEMICAL DEVICE

TECHNICAL FIELD

The present invention relates to a carbonaceous material, a method for producing the same, an electrode active material for an electrochemical device, an electrode for an electrochemical device, and an electrochemical device.

BACKGROUND ART

Electric double-layer capacitors, which are one type of electrochemical devices, use a capacity (electric double-layer capacity) obtained only from physical ion adsorption/desorption without involving any chemical reaction and therefore have excellent output characteristics and lifetime characteristics as compared to batteries. In addition, lithium-ion capacitors, which are one type of electrochemical devices, have attracted attention as hybrid capacitors that can increase the energy density of electric double-layer capacitors. Also, in recent years, due to the excellent characteristics of the above electrochemical devices and the urgent countermeasures against environmental problems, the electrochemical devices have been attracting attention for application for auxiliary power sources and regenerative energy storage in electric vehicles (EV) and hybrid vehicles (HV), and the like. Such in-vehicle automotive electrochemical devices are required not only to have higher energy density, but also to have higher durability and improved electrostatic capacitance under severe usage conditions (e.g., under a severe temperature environment) compared to consumer use.

For such requirements, various methods for improving the durability and electrostatic capacitance of electrochemical devices have been studied. For example, Patent Documents 1 and 2 disclose that activated carbon before or after pulverization is heat-treated at a high temperature in order to increase the electrostatic capacitance and suppress gas generation after durability test. Also, Patent Document 3 discloses heat-treating activated carbon at high temperatures for the purpose of further improving durability, to thereby control the intra-skeletal oxygen amount in addition to the amount of surface functional groups of the activated carbon. In addition, Patent Document 4 describes an improvement in the electrostatic capacitance and durability of activated carbon obtained by alkali activation, which has an increased specific surface area and higher crystallinity.

PRIOR ART DOCUMENTS

Patent Documents

Patent Document 1: WO-A-2008/053919
Patent Document 2: JP-A-2011-11935
Patent Document 3: WO-A-2018/207769
Patent Document 4: JP-A-2017-147338

SUMMARY OF THE INVENTION

Problems to be Solved by the Invention

However, the heat treatment at a high temperature as described in Patent Documents 1 and 2 is likely to cause a decrease in the specific surface area and pore volume of activated carbon. Also, as described in Patent Document 3, even if the heat treatment is performed at high temperatures to reduce the intra-skeletal oxygen amount, hydrogen present on the outer periphery of carbon is also reduced along with oxygen in the skeleton and therefore a decrease in the specific surface area and pore volume is likely to occur. Therefore, the activated carbons described in these documents were not necessarily sufficiently satisfactory regarding the initial capacitance per mass and per volume. Furthermore, the activated carbon obtained by alkali activation as described in Patent Document 4, to which an agent is generally added in an amount equal to or higher than the carbon content at the time of activation, requires a step of removing the residual agent after alkali activation, and therefore, the production method becomes complicated. In addition, as compared with activated carbon obtained by water vapor activation, the number of functional groups in the activation is increased, and the durability may be lowered.

The present invention has been made in view of the above situations. An object of the present invention is to provide a carbonaceous material from which an electrochemical device having a high initial electrostatic capacitance, an excellent effect of suppressing gas generation during charging and discharging, and excellent durability can be obtained, and a method for producing the carbonaceous material, an electrode active material for an electrochemical device including the carbonaceous material, an electrode for an electrochemical device including the electrode active material, and an electrochemical device.

Solutions to the Problems

The inventors have reached the present invention as a result of repeated detailed studies on carbonaceous materials and methods for producing the same in order to solve the above problems.

That is, the present invention includes the following preferred embodiments.

[1] A carbonaceous material having a BET specific surface area of 1550 to 2500 $m^2/g$, a value of an oxygen content/hydrogen content per specific surface area of 1.00 to 2.10 $mg/m^2$, and an electrical conductivity of 10 to 15 S/cm determined by powder resistance measurement at a load of 12 kN.

[2] The carbonaceous material according to the above [1], the carbonaceous material having a value of an oxygen content/hydrogen content of 2.0 to 4.3.

[3] The carbonaceous material according to the above [1] or [2], wherein the carbonaceous material is based on a carbon precursor derived from a plant.

[4] The carbonaceous material according to any one of the above [1] to [3], wherein the carbon precursor is derived from a coconut shell.

[5] A method for producing a carbonaceous material, the method comprising: a heating step of heating a carbonaceous material precursor to 330° C. or higher under an oxidizing gas atmosphere; and a temperature lowering step of lowering a temperature of the carbonaceous material precursor heated to 330° C. or higher under the oxidizing gas atmosphere, which is carried out under a non-oxidizing gas atmosphere, wherein, when the heating step performed under the oxidizing gas atmosphere is included once, the temperature lowering step is performed following the heating step, when the heating step performed under the oxidizing gas atmosphere is included a plurality of times, the temperature lowering step is performed at least following a final heating step performed under the oxidizing gas atmosphere, and wherein the carbonaceous material precursor used for the final heating step performed under the oxidizing gas atmosphere has an electrical conductivity of 11 to 16 S/cm determined by powder resistance measurement at a load of 12 kN.

[6] The method for producing a carbonaceous material according to the above [5], wherein the temperature of a carbonaceous material precursor is lowered to 200° C. or lower in the temperature lowering step.

[7] An electrode active material for an electrochemical device, the electrode active material being formed from the carbonaceous material according to any one of the above [1] to [4].

[8] An electrode for an electrochemical device, the electrode comprising the electrode active material for an electrochemical device according to the above [7].

[9] An electrochemical device comprising the electrode for an electrochemical device according to the above [8].

Effects of the Invention

According to the present invention, a carbonaceous material from which an electrochemical device having a high initial electrostatic capacitance, an excellent effect of suppressing gas generation during charging and discharging, and excellent durability can be obtained, and a method for producing the carbonaceous material, an electrode active material for an electrochemical device including the carbonaceous material, an electrode for an electrochemical device including the electrode active material, and an electrochemical device can be provided.

BRIEF DESCRIPTION OF THE DRAWINGS

FIG. 1 shows a sheet electrode composition.

FIG. 2 shows a current collector (etched aluminum foil) coated with a conductive adhesive.

FIG. 3 shows a polarizable electrode in which the sheet electrode composition and the current collector are bonded and an aluminum tab is ultrasonically welded.

FIG. 4 shows a bag-shaped exterior sheet.

FIG. 5 shows an electrochemical device.

EMBODIMENTS OF THE INVENTION

Hereinafter, embodiments of the present invention will be described in detail. It should be noted that the scope of the present invention is not limited to the embodiments described here, and various modifications can be made without departing from the spirit of the present invention.

Note that, in the present invention, a carbonaceous substance before performing the temperature lowering treatment in the above-mentioned temperature lowering step is referred to as "carbonaceous material precursor", and a carbonaceous substance obtained by performing the above-mentioned final heat treatment, and then performing the above-mentioned temperature lowering treatment on a carbonaceous material precursor is sometimes referred to as "carbonaceous material". Further, in the present specification, a carbide of a carbon precursor that serves as a raw material is sometimes referred to as "carbide" to distinguish it from a carbonaceous substance (activated carbon) obtained by activation treatment of the carbide. The "carbonaceous material precursor" in the present invention broadly includes carbonaceous substances before performing the temperature lowering treatment, such as carbides of carbon precursors serving as raw materials, and carbonaceous substances (activated carbons) obtained by activation treatment of carbides.

Carbonaceous Material

In the carbonaceous material of the present invention, BET specific surface area is 1550 to 2500 $m^2/g$, a value of a hydrogen content/oxygen content per specific surface area is 1.00 to 2.10 $mg/m^2$, and an electrical conductivity determined by powder resistance measurement at a load of 12 kN is 10 to 15 S/cm.

The BET specific surface area of the carbonaceous material of the present invention is 1550 $m^2/g$ or more, and preferably 1600 $m^2/g$ or more, as well as 2500 $m^2/g$ or less, preferably 2450 $m^2$ or less, and more preferably 2400 $m^2/g$ or less. Generally, an electrostatic capacitance per unit area is constant. Therefore, if the BET specific surface area is less than 1550 $m^2/g$, it is difficult to sufficiently increase the electrostatic capacitance per unit mass. In addition, since the average pore size is relatively small, the resistance that is considered to be due to the diffusion resistance of non-aqueous electrolyte ions in the pores tends to increase during charging and discharging under large current. On the other hand, if the BET specific surface area exceeds 2500 $m^2/g$, the bulk density of an electrode produced by using the carbonaceous material tends to be low, and the electrostatic capacitance per volume tends to be low.

The carbonaceous material of the present invention has a value of an oxygen content (mass %)/hydrogen content (mass %) per specific surface area (hereinafter, may be simply referred to as "O/H per specific surface area") of 1.00 $mg/m^2$ of more, preferably 1.10 $mg/m^2$ or more, and more preferably 1.20 $mg/m^2$ or more, as well as 2.10 $mg/m^2$ or less, preferably 2.08 $mg/m^2$ or less, and more preferably 2.06 $mg/m^2$ or less. In the present invention, "an oxygen content, O" indicates the mass of oxygen in the carbonaceous material obtained from the measurement results of elemental analysis described later, and the sum of the amount of surface oxygen present on the surface of the carbonaceous material and the amount of oxygen incorporated and present in the skeleton of the carbonaceous material. In addition, "a hydrogen content, H" indicates the amount of hydrogen present on the outer periphery of the carbon crystal of the carbonaceous material. Here, the amount of surface oxygen present on the surface of the carbonaceous material represents the degree of functional groups that contributes to the deterioration of durability and gas generation, and the amount of oxygen incorporated and present in the skeleton of the carbonaceous material and the amount of hydrogen present on the outer periphery of the crystal represent the degree of development of the carbon crystal structure. Therefore, the O/H per specific surface area is an index for suppressing the growth of the carbon crystal of the carbonaceous material and showing an appropriate amount of oxygen from the viewpoint of durability and gas generation. Therefore, when the O/H per specific surface area is not less than the above-mentioned lower limit, it is presumed that oxygen on the surface of the carbonaceous material is appropriately present and that the affinity with a binder is improved, and electrode formability is excellent. In addition, it is presumed that the carbon structure of the carbonaceous material is sufficiently developed and the crystallinity is high, and thus, the electrical conductivity of the carbonaceous material itself is improved. On the other hand, when the O/H per specific surface area is not more than the above-mentioned upper limit, it is presumed that the amount of surface oxygen present on the surface of the carbonaceous material is appropriately reduced and that gas generation during charging and discharging is suppressed. In addition, it is presumed that excessive development of the carbon crystal structure of the carbonaceous material can be suppressed and that the shrinkage of the pores of the carbonaceous material accompanying the excessive development of the carbon crystal structure can be suppressed, and a decrease in the initial electrostatic capacitance per mass is easily suppressed. The O/H value per specific surface area in the present invention is a value calculated according to the method described in Examples mentioned later.

The carbonaceous material of the present invention preferably has an electrical conductivity of 10 S/cm or more, preferably 10.5 S/cm or more, and more preferably 11 S/cm or more, as well as 15 S/cm or less, preferably 14.5 S/cm or less, and more preferably 14 S/cm or less, which is determined by powder resistance measurement at a load of 12 kN. When the conductivity is not more than the above-mentioned upper limit, which is determined by powder resistance measurement at a load of 12 kN, since excessive development of the carbon crystal structure of the carbonaceous material can be suppressed, and the shrinkage of the pores of the carbonaceous material accompanying the excessive development of the carbon crystal structure can be suppressed, it is presumed that a decrease in the initial electrostatic capacitance per mass tends to be suppressed. On the other hand, when the electrical conductivity measured by powder resistance measurement at a load of 12 kN is equal to or higher than the above lower limit, the carbon crystal structure of the carbonaceous material is sufficiently developed and the crystallinity is high, and thus, it is presumed that an improvement in the conductivity of carbon itself can suppress an increase in resistance due to current leakage during charging and discharging, thereby improving the capacity retention rate.

The average pore size of the carbonaceous material of the present invention is preferably 1.75 nm or more, more preferably 1.78 nm or more, and still more preferably 1.80 nm or more. When the average pore size is not less than the above-mentioned lower limit, the resistance that is considered to be due to the diffusion resistance of non-aqueous electrolyte ions in the pores tends to decrease during charging and discharging under large current. In addition, the average pore size of the carbonaceous material of the present invention is preferably 2.60 nm or less, more preferably 2.55 nm or less, and still more preferably 2.50 nm or less. When the average pore size is not more than the above-mentioned upper limit, the bulk density of an electrode produced by using the carbonaceous material tends to be high, and the electrostatic capacitance per volume tends to be high. By controlling the BET specific surface area and the average pore size of the carbonaceous material within the upper and lower limits, respectively, a more suitable carbonaceous material for obtaining an electrochemical device having a secured high electrostatic capacitance per unit mass and volume and having low resistance can be obtained. Note that the average pore size can be measured by the method described in Examples mentioned later.

The total pore volume of the carbonaceous material of the present invention is preferably 0.70 cm³/g or more, and more preferably 0.72 cm³/g or more. When the total pore volume is not less than the above-mentioned lower limit, the resistance that is considered to be due to the diffusion resistance of non-aqueous electrolyte ions in the pores tends to decrease during charging and discharging under large current. In addition, the total pore volume of the carbonaceous material of the present invention is preferably 1.30 cm³/g or less, more preferably 1.29 cm³/g or less, and still more preferably 1.28 cm³/g or less. When the total pore volume is not more than the above-mentioned upper limit, the bulk density of an electrode produced by using the carbonaceous material tends to be high, and the electrostatic capacitance per volume tends to be high. Note that the total pore volume can be measured by the method described in Examples mentioned later.

The carbonaceous material of the present invention preferably has a value of an oxygen content (mass %)/hydrogen content (mass %) of 2.0 or more, more preferably 2.25 or more, and still more preferably 2.5 or more, and particularly, preferably 2.6 or more and more preferably 2.7 or more, as well as preferably 4.3 or less, more preferably 4.2 or less, and still more preferably 4.1 or less. Within the above range, the effect of suppressing gas generation and the effect of suppressing a decrease in the electrostatic capacitance can be further enhanced.

The average particle diameter of the carbonaceous material of the present invention is preferably 30 μm or less and more preferably 20 μm or less, as well as preferably 2 μm or more and more preferably 4 μm or more. Within the above range, an electrode produced by using the carbonaceous material can be thinned, as well as the bulk density is improved, and the electrostatic capacitance per volume tends to be high. Note that the value of the average particle diameter in the present invention is a value calculated according to the method described in Examples mentioned later.

Method for Producing Carbonaceous Material

The carbonaceous material of the present invention can be produced by, for example, a method comprising a heating step of heating a carbonaceous material precursor to 330° C. or higher under an oxidizing gas atmosphere, and a temperature lowering step of lowering the temperature of the carbonaceous material precursor heated to 330° C. or higher under the oxidizing gas atmosphere, which is carried out under a non-oxidizing gas atmosphere, wherein, when the heating step performed under the oxidizing gas atmosphere is included once, the temperature lowering step is performed following the heating step, and when the heating step is performed under the oxidizing gas atmosphere is included a plurality of times, the temperature lowering step is performed at least following the final heating step performed under the oxidizing gas atmosphere, and wherein the carbonaceous material precursor used for the final heating step performed under the oxidizing gas atmosphere has a conductivity of 11 to 16 S/cm determined by powder resistance measurement at a load of 12 kN.

When the heating step performed under the oxidizing gas atmosphere is included once, the temperature lowering step is performed following the heating step, and when the heating step performed under the oxidizing gas atmosphere is included a plurality of times, the temperature lowering step is performed at least following a final heating step performed under the oxidizing gas atmosphere. In the present invention, by cooling the carbonaceous material precursor under a non-oxidizing gas atmosphere following the final heating step of heating the carbonaceous material precursor to 330° C. or higher under the oxidizing gas atmosphere, the amount of surface oxygen present on the surface of the carbonaceous material obtained and the intra-skeletal oxygen amount can be reduced while suppressing pore shrinkage.

In the above production method, examples of the heating step performed under the oxidizing gas atmosphere include an activation step of activating carbide of a carbon precursor as a raw material and a deacidification step performed after an acid washing step of removing impurities if necessary. The activation step may be performed in one step or two or more steps in order to obtain the desired specific surface area. In addition, the acid washing for removing impurities in the substance may be performed after the activation is completed, may be performed during the multi-step activation, or may be performed repeatedly several times. After the acid washing, it is preferable to perform a heat treatment (deacidification step) in order to remove an acid component remaining in the pores, for example, chlorine. In the present invention, it is important that a carbonaceous material precursor is cooled in a non-oxidizing gas atmosphere in the temperature lowering step after the final heating step among the heating steps of heating the carbonaceous material precursor to 330° C. or higher under an oxidizing gas atmosphere. When the heating step performed under an oxidizing gas atmosphere is performed a plurality of times, the temperature lowering (cooling) other than the temperature lowering step for the carbonaceous material precursor heated to 330° C. or higher in the final heating step may be performed under a non-oxidizing gas atmosphere or may be performed under an oxidizing gas atmosphere. In addition, in a method for producing the carbonaceous material of the present invention, after the temperature lowering for a carbonaceous material precursor heated to 330° C. or higher by a final heating step under an oxidizing gas atmosphere is performed under a non-oxidizing gas atmosphere, a heating step under a non-oxidizing gas atmosphere may be included as long as it does not affect the effects of the present invention. However, in order to avoid pore shrinkage due to heating as much as possible, it is preferable that the final heating step among the heating steps of heating a carbonaceous material precursor to 330° C. or higher, which is included in the production method of the present invention, is performed under an oxidizing gas atmosphere, and that a subsequent temperature lowering step is performed under a non-oxidizing gas atmosphere.

In the production method, the carbonaceous material precursor used for the final heating step performed under the oxidizing gas atmosphere has an electrical conductivity of 11 to 16 S/cm determined by powder resistance measurement at a load of 12 kN. When the electrical conductivity determined by powder resistance measurement of the carbonaceous material precursor at a load of 12 kN is 11 to 16 S/cm in the stage of final heat treatment performed under the oxidizing gas atmosphere, a carbonaceous material having a higher crystallinity in the carbonaceous material precursor can be obtained, and when used as a material for an electrode active material for an electrochemical device, a high capacity retention rate is easily exhibited and durability is easily improved. As a result, there can be obtained a carbonaceous material from which an electrochemical device having a high initial electrostatic capacitance, an excellent effect of suppressing gas generation during charging and discharging, and excellent durability capable of maintaining a high initial electrostatic capacitance for a long time due to the crystallization structure highly developed may be prepared. In the method for producing a carbonaceous material of the present invention, when the heating step performed under the oxidizing gas atmosphere is included only once, the heating step corresponds to the "final heating step performed under an oxidizing gas atmosphere".

Hereinafter, each step will be described in detail.

In the present invention, a carbon precursor used as a raw material for the carbonaceous material is not particularly limited as long as it forms the carbonaceous material by activation, and it can be widely selected from a plant-derived carbon precursor, a mineral-derived carbon precursor, a carbon precursor derived from a natural material, a carbon precursor derived from a synthetic material, and the like. From the viewpoint of reducing harmful impurities, protecting the environment, and commerce, the carbonaceous material of the present invention is preferably based on the plant-derived carbon precursor, in other words, the carbon precursor that becomes the carbonaceous material of the present invention is preferably derived from a plant.

Examples of the mineral-derived carbon precursor include petroleum-based and carbon-based pitch and coke. Examples of the carbon precursor derived from the natural material include natural fibers such as cotton and hemp, regenerated fibers such as rayon and viscose rayon, and semisynthetic fibers such as acetate and triacetate. Examples of the carbon precursor derived from the synthetic material include polyamide-based resins such as nylon, polyvinyl alcohol-based resins such as vinylon, polyacrylonitrile-based resins such as acryl resin, polyolefin-based resins such as polyethylene and polypropylene, polyurethane, phenol-based resins, and vinyl chloride-based resins.

In the present invention, the plant-derived carbon precursor is not particularly limited, and examples thereof include a coconut shell, coffee bean, tea leaf, sugar cane, fruit (e.g., an orange and banana), straw, rice husk, broad leaved tree, needle leaved tree, and bamboo. These exemplified materials also include waste after use for their intended purpose (e.g., used tea leaf) or a part of the plant materials (e.g., banana or orange peel). These plant raw materials may be used alone or in combination of two or more. Among these plant raw materials, the coconut shell is preferable because it is readily available and can yield a carbonaceous material having various properties. Therefore, the carbonaceous material of the present invention is preferably based on a plant-derived carbon precursor, and more preferably based on a carbon precursor derived from the coconut shell.

The coconut shell is not particularly limited, but examples thereof include coconut shells of a palm (oil palm), coconut palm, salak, and double coconut. These coconut shells may be used alone or in combination of two or more. From the viewpoint of availability, the coconut shells of a coconut palm and a palm, which are biomass wastes generated in large amount after utilization of the coconuts as food, detergent raw materials, biodiesel oil raw materials, or the like are particularly preferable.

Carbonization Process

A method for obtaining carbide that is a carbonaceous material precursor from the carbon precursor is not particularly limited, and it can be produced by using a method known in the art. For example, it can be produced by calcining (carbonization treatment) the carbon precursor as a raw material at a temperature of about 400 to 800° C. under an atmosphere of, for example, an inert gas such as nitrogen, carbon dioxide, helium, argon, carbon monoxide, a mixed gas of these inert gases, or a mixed gas of any of the above inert gases and another gas having any of the above inert gases as a main component. As the carbonization method, for example, a publicly known method such as a fixed bed method, a moving bed method, a fluidized bed method, a multi-stage floor method, or a rotary kiln may be employed.

Activation Process

In the present invention, the carbonaceous material precursor (activated carbon) as a raw material can be obtained, for example, by performing an activation treatment of the above-mentioned carbide. The activation treatment is a treatment in which pores are formed on the surface of the carbide and the carbide is converted into a porous carbonaceous substance, whereby a carbonaceous substance (carbonaceous material precursor) having a large specific surface area and pore volume can be obtained. If the carbide is used as it is without the activation treatment, the specific surface area and pore volume of the carbonaceous substance obtained are not sufficient, and the development of the carbon crystal structure also becomes insufficient. Therefore, when the carbonaceous substance obtained is used for an electrode material, it is difficult to secure a sufficiently high initial capacitance and to obtain the carbonaceous material of the present invention. The activation treatment (activation step) usually requires heating of carbide, and the carbonaceous material precursor obtained is heated to 330° C. or higher in association with the activation step. Therefore, the activation step may be one aspect of the heating step in the present invention. The activation treatment can be performed by a method general in the art, which mainly includes two types of treatment methods, a gas activation treatment and a chemical activation treatment.

As the gas activation treatment, a known method is, for example, heating carbide in the presence of water vapor, carbon dioxide, air, oxygen, combustion gas, or a mixed gas thereof. As the chemical activation treatment, for example, there is known a method of mixing a carbon precursor or the carbide of a carbon precursor with an activator such as zinc chloride, calcium chloride, phosphoric acid, sulfuric acid, sodium hydroxide, potassium hydroxide, magnesium hydroxide, and calcium hydroxide, and heating the mixture under an inert gas atmosphere. The chemical activation requires a process of removing the residual chemical, which makes the production method complicated, and the number of functional groups in the activation also increases; therefore, the gas activation treatment is preferable in the present invention.

When water vapor activation is employed as the gas activation treatment, it is preferable to use a mixture of water vapor and the same inert gas as used in the carbonization treatment from the viewpoint of efficiently advancing the activation, and the partial pressure of the water vapor at the time of the activation is preferably in the range of 10 to 60%. When the partial pressure of water vapor is 10% or more, the activation can be sufficiently advanced, and when it is 60% or less, the rapid activation reaction can be suppressed and the reaction can be easily controlled.

The total amount of the activation gas supplied in the water vapor activation is preferably 50 to 10000 parts by mass, more preferably 100 to 5000 parts by mass, and still more preferably 200 to 3000 parts by mass with respect to 100 parts by mass of the carbide. When the total amount of the activated gas to be supplied is within the above range, the activation reaction can be advanced more efficiently.

The specific surface area and pore volume of the carbonaceous material can be controlled by changing the method and conditions of the activation treatment of the carbide. For example, when the carbonaceous material precursor is obtained by the water vapor activation treatment, the specific surface area and pore volume can be controlled by the type of gas used, the concentration, the heating temperature, the reaction time, and the like. In the present invention, when the carbonaceous material precursor is obtained by the water vapor activation treatment, its heating temperature (activation temperature) is, although it depends on the type of gas used, usually 700 to 1100° C., preferably 800 to 1000° C., and more preferably 850 to 1000° C.

Generally, in the gas activation treatment, the decarburization reaction (pore formation) and crystallization proceed by heating carbide under the condition accompanying a reactive gas. Crystallization rather than the formation of pores due to the decarburization reaction can be promoted by controlling the reaction rate during activation, and a carbonaceous material precursor (activated carbon) having high electrical conductivity can be obtained. Specifically, if the reaction rate during activation is lowered under a predetermined activation temperature, crystallization is more likely to proceed than pore formation due to the decarburization reaction, so that the powder conductivity is increased, and the capacity retention rate can be improved. Here, in the present invention, the "reaction rate during activation" means an increased amount in the BET specific surface area per minute. From the viewpoint that a carbonaceous material precursor with a sufficiently developed carbon crystal structure is obtained, the reaction rate during activation is preferably 3.5 $m^2/g$ or less per minute at a temperature of, for example, 850 to 1000° C., more preferably 3.0 $m^2/g$ or less, and preferably 0.5 $m^2/g$ or more, and more preferably 0.75 $m^2/g$ or more. When the increased amount in the BET specific surface area per minute is within the above range, the crystallization is more likely to proceed while the pore formation proceeds relatively slowly and suitably. The obtained carbonaceous material tends to exhibit a high capacity retention rate, when it is used as a material for the electrode active material for the electrochemical device, and the durability is easily improved. When the activation treatment is performed by a multi-step, the reaction rate at each step may be appropriately determined considering the production facility, productivity, and the like, but if the reaction rate is at least in part within the above range, the carbon crystal structure of the obtained carbonaceous material precursor is easily controlled.

The reaction rate during activation can be controlled by adjusting, for example, the contact conditions (contact efficiency, activation gas type, activation gas amount and activation gas concentration/supply amount, and the like) between the carbide to be subjected to activation treatment and the activation gas, the activation temperature, the type, amount, state (dispersed state and salt composition) of reaction auxiliary substances and the like. The contact conditions between the carbide and the activation gas can be controlled by the activation method, the facility/apparatus used for activation, the gas amount supplied, the concentration, and the like. In the present invention, it is preferable to adopt an activation method that may achieve the reaction rate during activation. For example, in a vertical flow furnace in which activation is normally performed with carbides and activated gas retained, the frequency of contact of the activated gas with the carbides increases, so that the decarburization reaction easily proceeds. In contrast, in the rotary kiln, the frequency of contact of the activation gas with the carbides is low, so that the decarburization reaction proceeds relatively slowly, and along with that, crystallization tends to proceed more easily. Therefore, in one aspect of the present invention, the rotary kiln is suitable as the facility/apparatus used for activation.

When the production method of the present invention includes an activation step as the heating step, it is preferred that the activation treatment is performed so that the carbonaceous material precursor obtained by the activation step has an electrical conductivity of 11 to 16 S/cm, which is determined by the powder resistance measurement at a load of 12 kN. A plurality of heat treatments that may be included in the carbonaceous material production process such as an activation step and a deacidification step cause pore formation and pore shrinkage, as well as are liable to cause disturbance of the carbon crystal structure. Since it is difficult to recover the disturbed carbon crystal structure, if the carbon crystal structure is sufficiently developed in the activation step, which is a relatively early process for producing a carbonaceous material, by controlling the progress of pore formation and crystallization in the activation step, it is easy to maintain the crystal structure also in the subsequent processes, and a carbonaceous material having high electrical conductivity can be obtained. In the production method of the present invention, a carbonaceous material may be produced using activated carbon that has already been activated as a starting material. Also in this case, it is preferable that the activated carbon (carbonaceous material precursor) as a starting material has high powder conductivity, and it is more preferable that the conductivity measured by powder resistance measurement at a load of 12 kN is 11 to 16 S/cm.

Acid Washing Step

In the present invention, the method for producing the carbonaceous material may include an acid washing step. The acid washing step is a process for removing impurities such as metal components contained in the carbonaceous material precursor by washing the carbonaceous material precursor with a washing liquid containing an acid. The acid washing step can be performed by immersing the carbonaceous material precursor obtained after the activation in the washing liquid containing an acid. Examples of the washing liquid include mineral acids or organic acids. Examples of the mineral acids include hydrochloric acid, sulfuric acid and the like. Examples of the organic acids include saturated carboxylic acids such as formic acid, acetic acid, propionic acid, oxalic acid, tartaric acid, and citric acid, aromatic carboxylic acids such as benzoic acid and terephthalic acid and the like. The acid used for the washing liquid is preferably a mineral acid and more preferably hydrochloric acid from the viewpoint of washing performance. Note that, it is preferable to wash with the acid and then further wash with water or the like to remove the excess acid. By this operation, the load on equipment in the subsequent process can be reduced. When the activation process is divided into multiple activation steps including a primary activation step, the acid washing step may be performed after the primary activation step or may be performed after the multiple activation steps.

The washing liquid can usually be prepared by mixing the acid and an aqueous solution. Examples of the aqueous solution include water and a mixture of water and a water-soluble organic solvent. Examples of the water-soluble organic solvent include alcohols such as methanol, ethanol, propylene glycol, and ethylene glycol.

The concentration of the acid in the washing liquid is not particularly limited, and the concentration may be appropriately adjusted according to the type of the acid used. The acid concentration of the washing liquid is preferably 0.1 to 3.0% and more preferably 0.3 to 1.0% based on the total amount of the washing liquid. If the hydrochloric acid concentration is too low, it is necessary to increase the number of acid-washing in order to remove impurities, and conversely, if the hydrochloric acid concentration is too high, the amount of residual hydrochloric acid increases. By setting the acid concentration in the above range, the acid washing step can be efficiently performed, which is preferable from the viewpoint of productivity.

The pH of the washing liquid is not particularly limited, and may be appropriately adjusted according to the type of the acid used, the object to be removed, and the like.

The liquid temperature for the acid-washing or water washing is not particularly limited, but is preferably 0 to 98° C., more preferably 10 to 95° C., and still more preferably 15 to 90° C. When the temperature of the washing liquid in immersing of the carbonaceous material precursor is within the above range, the washing can be performed in a practical time with the load on the apparatus suppressed.

When immersing the carbonaceous material precursor in the washing liquid, the mass ratio of the washing liquid and the carbonaceous material may be appropriately adjusted according to the type, concentration, temperature, and the like of the washing liquid used. The mass of the carbonaceous material precursor to be immersed is usually 0.1 to 50% by mass, preferably 1 to 20% by mass, and more preferably 1.5 to 10% by mass with respect to the mass of the washing liquid. Within the above range, impurities eluted in the washing liquid are less likely to precipitate from the washing liquid and are easily inhibited from reattachment to the carbonaceous material precursor, and volumetric efficiency is appropriate, which is desirable from the viewpoint of economy.

The atmosphere for the washing is not particularly limited and may be appropriately selected depending on the method used for the washing. In the present invention, the washing is usually performed in an air atmosphere.

The washing may be performed once or a plurality of times with one type of the washing liquid, or may be performed a plurality of times in combination of two or more types of the washing liquid.

The method for washing the carbonaceous material precursor is not particularly limited as long as the carbonaceous material precursor can be immersed in the washing liquid, and may be a method in which the carbonaceous material precursor is immersed in the washing liquid with the washing liquid being continuously added, retained for a predetermined time, and then withdrawn, or may be a method in which the carbonaceous material precursor is immersed in the washing liquid, retained for a predetermined time, and then immersed in the fresh washing liquid after deliquoring, thus repeating such immersing and deliquoring. In addition, it may be a method of updating the entire washing liquid or a method of updating a part of the washing liquid. The time for immersing the carbonaceous material precursor in the washing liquid can be appropriately adjusted according to the acid used, the concentration of the acid, the treatment temperature, and the like.

Deacidification Step

In the present invention, the method for producing the carbonaceous material may include a deacidification step for removing the acid (e.g., hydrochloric acid) derived from the acid washing liquid remaining after the acid washing. In the present invention, the deacidification step can be performed by heating the carbonaceous material precursor under an oxidizing gas atmosphere after the acid washing. Since the carbonaceous material precursor is usually heated to 330° C. or higher in the deacidification step, the deacidification step may be one aspect of the heating step in the present invention. In addition, it is possible to adjust the time of contact with the oxidizing gas and the temperature and to remove the residual acid with further activation reaction. When the deacidification step is a final heating step performed under the oxidizing gas atmosphere, the carbonaceous material precursor preferably has an electrical conductivity of 11 to 16 S/cm determined by powder resistance measurement at a load of 12 kN in the stage subjected to the heating step. Normally, the powder conductivity of the carbonaceous material precursor changes by subjecting it to a heat treatment of 330° C. or higher, and does not change significantly unless such a heat treatment is performed. Therefore, the measurement of the powder conductivity of the carbonaceous material precursor may be performed considering each steps included in the production method to be adopted, and does not necessarily have to be immediately before the final heating step under the oxidizing gas atmosphere. For example, when the acid washing is performed after the activation step as described above and the deacidification process is performed as the final heat treatment under the oxidizing gas atmosphere, the measurement may be performed from after the heating step performed before the deacidification step (that is, the activation step in this case) until immediately before the deacidification step.

As the oxidizing gas, the gas used under the gas activation step can be used. Note that, in the present invention, "under an oxidizing gas atmosphere" means a state in which the total amount of an oxidizing gas per carbonaceous material precursor in the container is 1.5 L/kg or more.

The temperature of the above treatment is preferably 500 to 1000° C. and more preferably 650 to 850° C. When the temperature is within the above range, the deacidification can be performed without causing significant change to the pore structure of the carbonaceous material precursor, which is preferable. The time varies depending on the temperature, but is usually about 30 minutes to 3 hours.

Systems for the above-mentioned deacidification is not particularly limited, but for example, publicly-known systems such as a fixed bed system, moving bed system, fluidized bed system, multi-stage bed system, and rotary kiln can be employed.

The average particle diameter of the carbon precursor or the carbonaceous material precursor derived from the coconut shell used in the activation step or the deacidification step can be adjusted according to the activation and deacidification steps.

Temperature Lowering Step after Heating

The method for producing the carbonaceous material of the present invention includes a temperature lowering step of lowering the temperature of the carbonaceous material precursor heated to 330° C. or higher under the oxidizing gas atmosphere, which is carried out under a non-oxidizing gas atmosphere. That is, in order to suppress the formation of functional groups due to the reaction between the carbon surface and the oxidizing gas (e.g., oxygen) present in the environment in the temperature lowering, the temperature lowering step is included, the temperature lowering step being performed under a non-oxidizing gas atmosphere after the final heating step among the heating steps in which the carbonaceous material precursor is heated to 330° C. or higher under the oxidizing gas atmosphere. Thereby, the carbonaceous material of the present invention can be obtained. A method of heating a carbonaceous material precursor after an activation treatment or a deacidification step under an inert gas atmosphere, in order to remove acidic functional groups present on the surface of a carbonaceous material precursor. In such a method, however, pore shrinkage is likely to occur due to the heating, and it may be difficult to secure a sufficiently high initial electrostatic capacitance when the carbonaceous material is used for an electrochemical device. In addition, there are problems in terms of productivity, such as the need for a further process for the heating and the need for strictly controlling the heating conditions. In the present invention, since it is not necessary to heat the carbonaceous material precursor under an inert gas atmosphere to reduce the acidic functional groups present on the surface of the carbonaceous material precursor and intra-skeletal oxygen, a carbonaceous material capable of providing an electrochemical device having a high initial electrostatic capacitance can be obtained without causing the pore shrinkage.

In the temperature lowering step, the temperature of the carbonaceous material precursor subjected to the final heat treatment under the oxidizing gas atmosphere is preferably lowered to 200° C. or. lower and more preferably 150° C. or lower under a non-oxidizing gas atmosphere. The temperature lowering time to reach the above temperature depends on the amount of the oxidizing gas present in the temperature lowering environment, but it is within 3 hours and preferably within 1 hour in consideration of productivity. In addition, it is more desirable from the viewpoint of oxidation suppression and productivity to use an indirect cooling device (e.g., a cooling kiln) to accelerate the temperature lowering rate and shorten the time in the temperature region where the carbonaceous material precursor in consideration of productivity.

Examples of the non-oxidizing gas include a nitrogen gas, dry hydrogen gas, ammonia gas, argon gas, helium gas, hydrogen gas, carbon monoxide gas, and hydrocarbon gas. Only one of these gases may be used alone, or two or more of these gases may be used as a mixed gas.

Under a non-oxidizing gas atmosphere means under an atmosphere in which an oxidizing gas is significantly reduced as compared with an atmosphere containing a large amount of the oxidizing gas such as air. Specifically, in the present invention, "under a non-oxidizing gas atmosphere" means a state in which the total amount of an oxidizing gas per carbonaceous material precursor in the container is 0.7 L/kg or less. In order to further enhance the effect of the present invention, the total amount of the oxidizing gas present in the environment at the time of the temperature lowering is preferably 0.5 L/kg or less, and more preferably 0.1 L/kg or less per carbonaceous material precursor. Within the above range, the formation of functional groups due to the reaction between the oxidizing gas and the carbon surface in the temperature lowering step can be suppressed.

Pulverization Step

In the present invention, the method for producing the carbonaceous material may include a pulverization process. The pulverization process is a step for controlling the shape and particle diameter of the carbonaceous material finally obtained to a desired shape and particle diameter. The carbonaceous material of the present invention is, due to its characteristics, particularly suitable as a material for non-aqueous polarizable electrodes used in electrochemical devices and the like, and it is preferable that the carbonaceous material is pulverized to the average particle diameter of preferably 4 to 15 µm and more preferably 5 to 10 µm, the particle diameter suitable for the above application.

A pulverizer used for the pulverization is not particularly limited, and for example, publicly-known pulverizers such as a cone crusher, double roll crusher, disc crusher, rotary crusher, ball mill, centrifugal roll mill, ring roll mill, centrifugal ball mill, and jet mill can be used alone or in combination.

Classification Step

In the present invention, the method for producing the carbonaceous material may include a classification step. For example, it is possible to obtain carbonaceous material particles having a narrow particle diameter distribution by excluding particles having a particle diameter of 1 µm or less. By removing such fine particles, it is possible to reduce the amount of binder in configuring the electrode. The classification method is not particularly limited, and examples thereof include a classification using a sieve, a wet classification, and a dry classification. Examples of a wet classifier include classifiers using a principle of a classification such as a gravity classification, inertial classification, hydraulic classification, and centrifugal classification. Examples of a dry classifier include classifiers using a principle of a classification such as s sedimentation classification, mechanical classification, and centrifugal classification. From the viewpoint of economy, the dry classifier is preferably used.

The pulverization and classification can also be performed using a single device. For example, the pulverization and classification can be performed using a jet mill having a dry classification function. Further, a device in which a pulverizer and a classifier are independent can be used. In this case, the pulverization and classification can be performed continuously, but the pulverization and classification can also be performed discontinuously.

The carbonaceous material of the present invention can be suitably used as an electrode material or the like for various electrochemical devices. Therefore, in one embodiment of the present invention, an electrode active material for an electrochemical device and a method for producing the same can be provided using the carbonaceous material of the present invention. In addition, an electrode for an electrochemical device and a method for producing the same can be provided using the electrode active material or an electrode active material obtained by the method for producing the electrode active material. Furthermore, an electrochemical device and a method for producing the same can be provided using the electrode or an electrode obtained by the method for producing the electrode.

The electrode active material for an electrochemical device can be produced by using the carbonaceous material of the present invention. The production process may comprise production steps generally used in the art, such as, for example, a step of kneading the carbonaceous material of the present invention as a raw material with components such as a conductivity-imparting agent, binder, and solvent, and a step of coating and drying the kneaded product. In addition, the electrode for an electrochemical device can be produced by using the electrode active material, and a production process thereof may comprise, for example, a step of adding a solvent to the electrode active material as a raw material to prepare a paste, a step of applying the paste to a current collector plate made of aluminum foil or the like and then drying and removing the solvent, and a step of putting the paste in a mold and press-molding it.

Examples of the conductivity imparting agent used for the electrode include acetylene black, Ketjen black. Examples of the binder include polytetrafluoroethylene, a fluorinated polymer compound such as polyvinylidene fluoride, carboxymethyl cellulose, styrene-butadiene rubber, petroleum pitch, a phenol resin. Examples of the solvent include water, alcohols such as methanol and ethanol, saturated hydrocarbons such as hexane and heptane, aromatic hydrocarbons such as toluene, xylene, and mesitylene, ketones such as acetone and ethyl methyl ketone, and esters such as methyl acetate and ethyl acetate, amides such as N,N-dimethylformamide and N,N-diethylformamide, cyclic amides such as N-methylpyrrolidone and N-ethylpyrrolidone.

The electrochemical device of the present invention can be produced by using the above-mentioned electrode. The electrochemical device generally has the electrode, an electrolyte solution, and a separator as main components, and has a structure in which the separator is arranged between a pair of the electrodes. Examples of the electrolytic solution include an electrolytic solution in which an amidine salt is dissolved; an electrolytic solution in which a quaternary ammonium salt of perchloric acid is dissolved; an electrolytic solution in which a tetrafluoroborate or a hexafluorophosphate of a quaternary ammonium or an alkali metal such as lithium is dissolved; and an electrolytic solution in which a quaternary phosphonium salt is dissolved, in an organic solvent such as propylene carbonate, ethylene carbonate, methyl ethyl carbonate, or acetonitrile. Examples of the separator include non-woven fabrics, cloths, and micropore films containing cellulose, glass fibers, or polyolefins such as polyethylene and polypropylene as main components. The electrochemical device can be produced, for example, by arranging these main constituent elements according to a common method conventionally used in the art.

The electrochemical device produced using the carbonaceous material of the present invention has a high electrical conductivity without performing heat treatment, which involves a decrease of the specific surface area and pore volume, and the amounts of surface functional groups present on the surface of the carbonaceous material, and intra-skeletal oxygen are reduced. Therefore, the initial electrostatic capacitance can be increased, the reactivity with the electrolyte solution is low, the effect of suppressing gas generation during charging and discharging is high, a decrease in the capacitance due to long-term use can be suppressed, the durability is excellent, and excellent performance can be maintained even at low temperatures.

EXAMPLES

The present invention will be described in more detail below based on Examples, but the following Examples do not limit the present invention. Physical property values in Examples and Comparative Examples were measured by the following methods.

Specific Surface Area Measurement

A nitrogen adsorption/desorption isotherm of a carbonaceous material at 77.4K was measured with BELSORP-mini manufactured by MicrotracBEL corporation after heating a carbonaceous material used as a sample at 300° C. under a nitrogen gas stream (nitrogen flow rate: 50 mL/min) for 3 hours. The obtained adsorption/desorption isotherm was analyzed by a multipoint method with the BET equation, and the specific surface area was calculated from a straight line in a region of a relative pressure $P/P_0=0.01$ to 0.1 of an obtained curve.

Total Pore Volume and Average Pore Size

A nitrogen adsorption/desorption isotherm of a carbonaceous material at 77.4K was measured with BELSORP-mini manufactured by MicrotracBEL corporation after heating a carbonaceous material used as a sample at 300° C. under a nitrogen gas stream (nitrogen flow rate: 50 mL/min) for 3 hours. Using the total pore volume determined from the nitrogen adsorption amount at a relative pressure $P/P_0=0.99$ on the adsorption isotherm obtained, the average pore size was calculated from the total pore volume and the specific surface area obtained from the above-mentioned BET method based on the following equation.

Average pore size (nm)=Total pore volume (cm$^3$/g)/ Specific surface area (m$^2$/g)×4000

Measurement Method for Oxygen Content and Hydrogen Content, O/H, O/H Per Specific Surface Area An EMGA-930 manufactured by HORIBA, Ltd. was used for the measurement. The detection methods of this device are, oxygen: non-dispersive infrared method (NDIR), and hydrogen: non-dispersive infrared method (NDIR). The calibration was performed with an (oxygen) Ni capsule and TiH$_2$ (an H standard sample) SS-3 (an O standard sample), and 5 mg of the sample, which had been subjected to a drying treatment as a pretreatment at 220° C. for about 10 minutes, was placed in the Ni capsule and was degassed in the above device for 30 seconds, and then the measurement was performed. The analysis was performed with 3 specimens in the test, and the average value was used as the analysis value. An O/H was determined from the value obtained, and the O/H was divided by the BET specific surface area obtained above to determine an O/H per specific surface area.

Measurement Method for Conductivity

The electrical conductivities of a carbonaceous material precursor after activation treatment and before acid washing, and of a carbonaceous material were measured using a powder resistance measurement unit "MCP-PD51" manufactured by Mitsubishi Chemical Analytech Co., Ltd. To measure the electrical conductivity, using a carbonaceous material precursor or a carbonaceous material having an average particle diameter of 5.0 μm to 6.0 μm, materials amounting to a thickness of carbonaceous material precursor pellets or carbonaceous material pellets of 3.5 to 4.5 mm when a load of 12 kN was applied were used. The conductivities of carbonaceous material precursor pellets and carbonaceous material pellets with a load of 12 kN applied were measured.

Measurement of Average Particle Diameter

A particle diameter of a carbonaceous material was measured by a laser diffraction measurement method. That is, a carbonaceous material to be measured was put into ion-exchanged water together with a surfactant, and ultrasonic vibration was applied using a BRANSONIC M2800-J manufactured by Emerson Electric Co. to prepare a uniform dispersion liquid, and then the particle diameter was measured by an absorption method using a Microtrac MT3000 manufactured by Microtrac Inc. In addition, as the surfactant used for the uniform dispersion, "Triton-X 100" manufactured by Kao Corporation was used. The surfactant was added in an appropriate amount which can be uniformly dispersed and does not generate bubbles or the like which affect the measurement.

Example 1

A char (BET specific surface area: 370 m$^2$/g) produced from the coconut shell of a coconut made in the Philippines was subjected to primary activation with a propane combustion gas and water vapor (water vapor partial pressure: 18%) at a reaction rate of 1.4 m$^2$/g per minute during activation at 950° C. until the surface specific area as shown below was attained, and a primary activated granular carbonaceous material precursor having a BET specific surface area of 1902 m$^2$/g and an average pore size of 1.93 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, nitrogen with a purity of 99.99% was circulated in the distribution container, and the primary activated granular carbonaceous material precursor was discharged. Also, after the combustion gas accompanied at the time of discharge was actively replaced with the nitrogen gas, it was cooled to 200° C. or lower (cooling time of about 1.0 hour) under the nitrogen gas atmosphere (a state in which the total amount of the oxidizing gas per mass of the primary activated granular carbonaceous material precursor in the container was 0.5 L/kg or less) to obtain a carbonaceous material.

This carbonaceous material was finely pulverized so that the average particle diameter was 6 μm to obtain a carbonaceous material (1) having a BET specific surface area of 1919 m$^2$/g and an average pore size of 1.93 nm. Various physical properties of the carbonaceous material (1) were measured. The results are shown in Table 1.

Comparative Example 1

A char (BET specific surface area: 370 m$^2$/g) produced from the coconut shell of a coconut made in the Philippines was subjected to primary activation with a propane combustion gas and water vapor (water vapor partial pressure: 18%) at a reaction rate of 1.3 m$^2$/g per minute during activation at 900° C. until the BET specific surface area mentioned below was attained, and a primary activated granular carbonaceous material precursor having a BET specific surface area of 1185 m$^2$/g was obtained. Thereafter, it was acid-washed with hydrochloric acid (concentration: 0.5 N, diluent: ion-exchanged water) at a temperature of 70° C. for 30 minutes and then thoroughly washed with ion-exchanged water, and desalted to remove residual acid. After the desalting, it was dried at 120° C. to obtain a primary washed granular carbonaceous material precursor. This granular carbonaceous material precursor was further subjected to secondary activation with a propane combustion gas and water vapor (water vapor partial pressure of 15%) at a reaction rate of 3.6 m$^2$/g during activation at 900° C. until the specific surface area mentioned below was attained, and a secondary activated granular carbonaceous material precursor having a BET specific surface area of 1859 m²/g and an average pore size of 2.00 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, the secondary activated granular carbonaceous material precursor was discharged together with the accompanied combustion gas into the container filled with air, and it was cooled to 200° C. or lower (cooling time of about 1.0 hour) in the same atmosphere (the total amount of the oxidizing gas per mass of the secondary activated granular carbonaceous material precursor in the container of 1.5 L/kg or more) to obtain a carbonaceous material.

This carbonaceous material was finely pulverized so that the average particle diameter was 6 μm to obtain a carbonaceous material (2) having a BET specific surface area of 1871 m²/g and an average pore size of 2.00 nm. Various physical properties of the carbonaceous material (2) were measured. The results are shown in Table 1.

Comparative Example 2

A char (BET specific surface area: 370 m²/g) produced from the coconut shell of a coconut made in the Philippines was subjected to primary activation with a propane combustion gas and water vapor (water vapor partial pressure: 18%) at a reaction rate of 1.2 m²/g per minute during activation at 900° C. until the surface specific area as shown below was attained, and a primary activated granular carbonaceous material precursor having a BET specific surface area of 1924 m²/g and an average pore size of 1.93 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, the treatment was performed at 700° C. in a propane combustion gas atmosphere. After the treatment was completed, the primary activated granular carbonaceous material precursor was discharged together with the accompanied combustion gas into the container filled with air, and it was cooled to 200° C. or lower (cooling time of about 1.0 hour) in the same atmosphere (the total amount of the oxidizing gas per mass of the primary activated granular carbonaceous material precursor in the container of 1.5 L/kg or more) to obtain a carbonaceous material.

This carbonaceous material was finely pulverized so that the average particle diameter was 6 μm to obtain a carbonaceous material (3) having a BET specific surface area of 1935 m²/g and an average pore size of 1.94 nm. Various physical properties of the carbonaceous material (3) were measured. The results are shown in Table 1.

Comparative Example 3

A carbonaceous material was obtained in the same manner as in Comparative Example 2. Next, the obtained carbonaceous material was subjected to a heat treatment by stepwise raising the temperature to 600° C. at a raising rate of 24° C./min, to 900° C. at a raising rate of 12° C./min, and to 1100° C. at a raising rate of 1.67° C./min, and then holding the temperature at 1100° C. for 60 minutes under a nitrogen atmosphere. Then, the carbonaceous material was naturally cooled in the atmosphere of the gas used (nitrogen) until the temperature in the furnace became 70° C. or lower (cooling time of about 3.0 hour) to obtain a heat-treated carbonaceous material. This heat-treated carbonaceous material was finely pulverized so that the average particle diameter was 6 μm to obtain a carbonaceous material (4) having a BET specific surface area of 1782 m²/g and an average pore size of 1.96 nm. Various physical properties of the carbonaceous material (4) were measured. The results are shown in Table 1.

Comparative Example 4

A carbonaceous material was obtained in the same manner as in Comparative Example 2. Next, the obtained carbonaceous material was subjected to a heat treatment by stepwise raising the temperature to 600° C. at a raising rate of 24° C./min, to 900° C. at a raising rate of 12° C./min, and to 1200° C. at a raising rate of 1.67° C./min, and then holding the temperature at 1200° C. for 60 minutes under a nitrogen atmosphere. Then, the carbonaceous material was naturally cooled in the atmosphere of the gas used (nitrogen) until the temperature in the furnace became 70° C. or lower (cooling time of about 3.0 hour) to obtain a heat-treated carbonaceous material. This heat-treated carbonaceous material was finely pulverized so that the average particle diameter was 6 μm to obtain a carbonaceous material (5) having a BET specific surface area of 1698 m²/g and an average pore size of 1.97 nm. Various physical properties of the carbonaceous material (5) were measured. The results are shown in Table 1.

Example 2

In the same manner as in Example 1, a primary activated granular carbonaceous material precursor having a BET specific surface area of 1688 m²/g and an average pore size of 1.81 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, nitrogen with a purity of 99.99% was circulated in the distribution container, and the primary activated carbonaceous material precursor was discharged. Also, after the combustion gas accompanied at the time of discharge was actively replaced with a nitrogen gas, it was cooled to 200° C. or lower (cooling time of about 1.0 hour) under the nitrogen gas atmosphere (a state in which the total amount of the oxidizing gas per mass of the primary activated granular carbonaceous material precursor in the container was 0.5 L/kg or less) to obtain a carbonaceous material.

This carbonaceous material was finely pulverized so that the average particle diameter was 6 μm to obtain a carbonaceous material (6) having a BET specific surface area of 1701 m²/g and an average pore size of 1.81 nm. Various physical properties of the carbonaceous material (6) were measured. The results are shown in Table 1.

Example 3

In the same manner as in Example 1, a primary activated granular carbonaceous material precursor having a BET specific surface area of 2372 m²/g and an average pore size of 2.25 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, nitrogen with a purity of 99.99% was circulated in the distribution container, and the primary activated granular carbonaceous material precursor was discharged. Also, after the combustion gas accompanied at the time of discharge was actively replaced with a nitrogen gas, it was cooled to 200° C. or lower (cooling time of about 1.0 hour) under the nitrogen gas atmosphere (a state in which the total amount of the oxidizing gas per mass of the primary activated granular carbonaceous material precursor in the container was 0.5 L/kg or less) to obtain a carbonaceous material.

This carbonaceous material was finely pulverized so that the average particle diameter was 6 μm to obtain a carbonaceous material (7) having a BET specific surface area of 2382 m²/g and an average pore size of 2.25 nm. Various physical properties of the carbonaceous material (7) were measured. The results are shown in Table 1.

Comparative Example 5

In the same manner as in Comparative Example 1, a secondary activated granular carbonaceous material precursor having a BET specific surface area of 1600 m²/g and an average pore size of 2.04 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, the secondary activated granular carbonaceous material precursor was discharged together with the accompanied combustion gas into the container filled with air, and it was cooled to 200° C. or lower (cooling time of about 1.0 hour) in the same atmosphere (the total amount of the oxidizing gas per mass of the secondary activated granular carbonaceous material precursor in the container of 1.5 L/kg or more) to obtain a carbonaceous material.

This carbonaceous material was finely pulverized so that the average particle diameter was 6 μm to obtain a carbonaceous material (8) having a BET specific surface area of 1615 m²/g and an average pore size of 2.04 nm. Various physical properties of the carbonaceous material (8) were measured. The results are shown in Table 1.

Comparative Example 6

In the same manner as in Comparative Example 1, a secondary activated granular carbonaceous material precursor having a BET specific surface area of 1600 m²/g and an average pore size of 2.01 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, nitrogen with a purity of 99.99% was circulated in the distribution container, and the secondary activated granular carbonaceous material precursor was discharged. Also, after the combustion gas accompanied at the time of discharge was actively replaced with a nitrogen gas, it was cooled to 200° C. or lower (cooling time of about 1.0 hour) under the nitrogen gas atmosphere (a state in which the total amount of the oxidizing gas per mass of the primary activated granular carbonaceous material precursor in the container was 0.5 L/kg or less) to obtain a carbonaceous material.

This carbonaceous material was finely pulverized so that the average particle diameter was 6 μm to obtain a carbonaceous material (9) having a BET specific surface area of 1615 m²/g and an average pore size of 2.01 nm. Various physical properties of the carbonaceous material (9) were measured. The results are shown in Table 1.

Comparative Example 7

A carbonaceous material was obtained in the same manner as in Comparative Example 5. Next, the obtained carbonaceous material was subjected to a heat treatment by stepwise raising the temperature to 600° C. at a raising rate of 24° C./min, to 900° C. at a raising rate of 12° C./min, and to 1100° C. at a raising rate of 1.67° C./min, and then holding the temperature at 1100° C. for 60 minutes under a nitrogen atmosphere. Then, the carbonaceous material was naturally cooled in the atmosphere of the gas used (nitrogen) until the temperature in the furnace became 70° C. or lower (cooling time of about 3.0 hour) to obtain a heat-treated carbonaceous material. This heat-treated carbonaceous material was finely pulverized so that the average particle diameter was 6 μm to obtain a carbonaceous material (10) having a BET specific surface area of 1486 m²/g and an average pore size of 2.02 nm. Various physical properties of the carbonaceous material (10) were measured. The results are shown in Table 1.

Comparative Example 8

A carbonaceous material was obtained in the same manner as in Comparative Example 5. Next, the obtained carbonaceous material was subjected to a heat treatment by stepwise raising the temperature to 600° C. at a raising rate of 24° C./min, to 900° C. at a raising rate of 12° C./min, and to 1100° C. at a raising rate of 1.67° C./min, and then holding the temperature at 1200° C. for 60 minutes under a nitrogen atmosphere. Then, the carbonaceous material was naturally cooled in the atmosphere of the gas used (nitrogen) until the temperature in the furnace became 70° C. or lower (cooling time of about 3.0 hour) to obtain a heat-treated carbonaceous material. This heat-treated carbonaceous material was finely pulverized so that the average particle diameter was 6 μm to obtain a carbonaceous material (11) having a BET specific surface area of 1448 m²/g and an average pore size of 2.03 nm. Various physical properties of the carbonaceous material (11) were measured. The results are shown in Table 1.

Comparative Example 9

In the same manner as in Comparative Example 1, a secondary activated granular carbonaceous material precursor having a BET specific surface area of 2236 m²/g and an average pore size of 2.23 nm was obtained. Thereafter, in order to measure the powder conductivity as the carbonaceous material precursor, a portion was sampled, then it was acid-washed with hydrochloric acid (concentration: 0.5 N, diluent: ion-exchanged water) at a temperature of 70° C. for 30 minutes and then washed with ion-exchanged water and dried. Then, in order to remove chlorine remaining in the pores, a deacidification treatment was performed at 700° C. in a propane combustion gas atmosphere. After the treatment was completed, the secondary activated granular carbonaceous material precursor was discharged together with the accompanied combustion gas into the container filled with air, and it was cooled to 200° C. or lower (cooling time of about 1.0 hour) in the same atmosphere (the total amount of the oxidizing gas per mass of the secondary activated granular carbonaceous material precursor in the container of 1.5 L/kg or more) to obtain a carbonaceous material.

This carbonaceous material was finely pulverized so that the average particle diameter was 6 μm to obtain a carbonaceous material (12) having a BET specific surface area of 2243 m²/g and an average pore size of 2.23 nm. Various physical properties of the carbonaceous material (12) were measured. The results are shown in Table 1.

TABLE 1

| | Reaction rate during activation (m²/g) | | Activation temperature (°C.) | | Powder conductivity before final heating under oxidezing gas (@12 kN: S/cm) | Temperature lowering process condition after final heat treatment under oxidizing gas (atmosphere) | Heat treatment after deacidification | Specific surface area (m²/g) |
|---|---|---|---|---|---|---|---|---|
| | Primary | Secondary | Primary | Secondary | | | | |
| Example 1 | 1.4 | — | 950 | — | 13 | Non-oxidizing | No heat treatment | 1919 |
| Comp. Example 1 | 1.3 | 3.6 | 900 | 900 | 8 | Oxidizing | No heat treatment | 1871 |
| Comp. Example 2 | 1.2 | — | 900 | — | 12 | Oxidizing | No heat treatment | 1935 |
| Comp. Example 3 | 1.2 | — | 900 | — | 12 | Oxidizing | With heat treatment (1100° C.) | 1782 |
| Comp. Example 4 | 1.2 | — | 900 | — | 12 | Oxidizing | With heat treatment (1200° C.) | 1698 |
| Example 2 | 1.4 | — | 950 | — | 14 | Non-oxidizing | No heat treatment | 1701 |
| Example 3 | 1.4 | — | 950 | — | 11 | Non-oxidizing | No heat treatment | 2382 |
| Comp. Example 5 | 1.3 | 3.6 | 900 | 900 | 10 | Oxidizing | No heat treatment | 1615 |
| Comp. Example 6 | 1.3 | 3.6 | 900 | 900 | 10 | Non-oxidizing | No heat treatment | 1615 |
| Comp. Example 7 | 1.3 | 3.6 | 900 | 900 | 10 | Oxidizing | With heat treatment (1100° C.) | 1486 |
| Comp. Example 8 | 1.3 | 3.6 | 900 | 900 | 10 | Oxidizing | With heat treatment (1200° C.) | 1448 |
| Comp. Example 9 | 1.3 | 3.6 | 900 | 900 | 9 | Oxidizing | No heat treatment | 2243 |

| | Total pore volume (cm³/g) | Average pore size (nm) | Powder conductivity (@12 kN: S/cm) | Elemental analysis | | | O/H per specific surface area (mg/m²) |
|---|---|---|---|---|---|---|---|
| | | | | O content (mass %) | H content (mass %) | O/H | |
| Example 1 | 0.928 | 1.93 | 12 | 1.46 | 0.40 | 3.7 | 1.93 |
| Comp. Example 1 | 0.934 | 2.00 | 7 | 1.92 | 0.48 | 4.0 | 2.14 |
| Comp. Example 2 | 0.939 | 1.94 | 10 | 2.13 | 0.46 | 4.6 | 2.38 |
| Comp. Example 3 | 0.872 | 1.96 | 15 | 1.88 | 0.32 | 5.9 | 3.31 |
| Comp. Example 4 | 0.836 | 1.97 | 18 | 1.51 | 0.16 | 9.4 | 5.54 |
| Example 2 | 0.771 | 1.81 | 12 | 1.46 | 0.42 | 3.5 | 2.06 |
| Example 3 | 1.340 | 2.25 | 10 | 1.54 | 0.45 | 3.4 | 1.43 |
| Comp. Example 5 | 0.824 | 2.04 | 9 | 1.80 | 0.43 | 4.1 | 2.54 |
| Comp. Example 6 | 0.810 | 2.01 | 8 | 1.55 | 0.47 | 3.3 | 2.04 |

TABLE 1-continued

| | | | | | | | |
|---|---|---|---|---|---|---|---|
| Comp. Example 7 | 0.750 | 2.02 | 15 | 1.53 | 0.27 | 5.7 | 3.84 |
| Comp. Example 8 | 0.734 | 2.03 | 18 | 1.55 | 0.19 | 8.2 | 5.66 |
| Comp. Example 9 | 1.249 | 2.23 | 8 | 2.23 | 0.43 | 5.2 | 2.32 |

Preparation of Measurement Electrode Cell

Using the carbonaceous materials prepared in Examples 1 to 3 and Comparative Examples 1 to 9, electrode compositions were obtained respectively, and polarizable electrodes were prepared by using the electrode compositions respectively according to the following electrode preparation method. Furthermore, measurement electrode cells (electrochemical devices) were prepared by using the polarizable electrodes, respectively. Using each obtained measurement electrode cell, electrostatic capacitance measurement, a durability test, and measurement of gas generation amount were performed according to the following methods. The measurement results are shown in Table 2.

The carbonaceous materials prepared in Examples 1 to 3 and Comparative Examples 1 to 9, a conductive auxiliary material, and a binder as electrode constituents were pre-dried at 120° C. under a reduced pressure atmosphere (0.1 kPa or less) for more than 16 hours before use.

Each carbonaceous material, the conductive auxiliary material, and the binder were weighed so that the ratio of (the mass of the carbonaceous material):(the mass of the conductive auxiliary material):(the mass of the binder) is 81:9:10 and kneaded. As the conductive auxiliary material, a conductive carbon black "DENKA BLACK Granule" manufactured by Denki Kagaku Kogyo Kabushiki Kaisha was used, and as the binder, polytetrafluoroethylene "6J" manufactured by Mitsui-DuPont Co., Ltd. was used. After the kneading, in order to attain further uniformity, the kneaded product was cut into flakes of 1 mm square or less, and a pressure of 400 kg/cm² was applied with a coin molding machine to obtain a coin-shaped secondary molded product. The secondary molded product obtained was molded into a sheet having a thickness of 160 µm±5% with a roll press, and then cut into a predetermined size (30 mm×30 mm) to prepare an electrode composition 1 as shown in FIG. 1. The obtained electrode composition 1 was dried at 120° C. under a reduced pressure atmosphere for 16 hours or more, and then the mass, sheet thickness, and dimensions were measured and used for the following measurements.

As shown in FIG. 2, an etched aluminum foil 3 manufactured by Hohsen Corp. was coated with a conductive adhesive 2 "HITASOL GA-715" manufactured by Hitachi Chemical Company, Ltd. so that the coating thickness was 100 µm. Then, as shown in FIG. 3, the etched aluminum foil 3 coated with the conductive adhesive 2 and the previously cut sheet electrode composition 1 were adhered to each other. Then, a tab 4 with an aluminum sealant 5 manufactured by Hohsen Corp. was welded to the etched aluminum foil 3 using an ultrasonic welding machine. After the welding, the laminate was vacuum-dried at 120° C. to obtain a polarizable electrode 6 provided with an aluminum current collector.

As shown in FIG. 4, an aluminum laminated resin sheet manufactured by Hohsen Corp. is cut into a rectangle (length 200 mm×width 60 mm), folded in half, and is thermocompression-bonded on one side ((1) in FIG. 4) to prepare a bag-shaped exterior sheet 7 having the remaining two sides open. Two pieces of the above-mentioned polarizable electrodes 6 were overlapped with each other via a cellulose separator "TF-40" (not shown) manufactured by Nippon Kodoshi Corporation to prepare a laminate. This laminate was inserted into the exterior sheet 7, and one side ((2) in FIG. 5) in contact with the tab 4 was thermocompression-bonded to fix the polarizable electrode 6. Then, after vacuum-drying at 120° C. under a reduced pressure atmosphere for 16 hours or more, an electrolyte solution was injected in a dry box with an argon atmosphere (dew point of −90° C. or lower). As the electrolyte solution, an acetonitrile solution containing 1.0 mol/L tetraethylammonium tetrafluoroborate manufactured by Kishida Chemical Co., Ltd. was used. After impregnating the laminate with the electrolyte solution in the exterior sheet 7, the remaining one side of the exterior sheet 7 ((3) in FIG. 5) was thermocompression-bonded to prepare an electrochemical device 8 shown in FIG. 5.

Measurement of Capacitance

The obtained electrochemical device 8 was charged with a constant current of 50 mA per electrode surface area at 25° C. and −30° C. until the voltage reached 3.0 V using a "CAPACITOR TESTER PFX2411" manufactured by Kikusui Electronics Corp. The electrochemical device 8 was further supplementarily charged at 3.0 V for 25 minutes under a constant voltage, and after completion of the supplementary charge, the electrochemical device 8 was discharged at 25 mA. The discharge curve data obtained was calculated by an energy conversion method and used as the electrostatic capacitance (F). Specifically, after the charging, the electrochemical device 8 was discharged until the voltage reduced to zero, and the electrostatic capacitance (F) was calculated from the energy that was discharged at this discharging. Then, the electrostatic capacitance (F/g) obtained by dividing it by the mass of the carbonaceous material of the electrodes was determined.

Durability Test

The durability test was performed according to the following method. After the electrostatic capacitance measurement described above, the electrochemical device was held in a thermostat bath at 60° C. for 600 hours while applying a voltage of 3.0 V, and then the electrostatic capacitance was measured at 25° C. and −30° C. in the same manner as above. From the electrostatic capacitance before and after the durability test, the capacity retention rate at each temperature was calculated according to the following equation. A time point before the start of the application of the voltage of 3.0 V in the thermostat bath at 60° C. was defined as "before the durability test", and a time point after the holding for 600 hours was defined as "after the durability test".

Capacity retention rate (%)=Electrostatic capacitance per mass of carbonaceous material after durability test/Capacitance per mass of carbonaceous material before durability test×100

Measurement of Gas Generation

The gas generation amount was determined by measuring the dry mass and the mass in water of the measurement electrode cell, determining the cell volume from the generated buoyancy and water density, and correcting the gas volume calculated from the change in the cell volume before and after the durability test by the temperature difference at the time of the measurement. That is, the gas generation amount was determined according to the following equation. Note that, in the equation, the cell mass A represents the cell mass (g) in the air, and the cell mass W represents the cell mass (g) in water.

Gas generation amount (cc)={(Cell mass A after durability test−Cell mass W after durability test)−(Cell mass A before durability test−Cell mass W before durability test)}/(273+Measurement temperature after durability test (° C.)/(273+Measurement temperature before durability test (° C.))

A value determined by further dividing the above gas generation amount by the mass of the carbonaceous material constituting the electrode composition was used as the gas generation amount (cc/g) per carbonaceous material mass.

trostatic capacitance due to a decrease in the specific surface area and pore volume, maintained the sufficient capacitance even after the durability test, and had a high effect of suppressing the gas generation amount.

From the above, it is obvious that the use of the carbonaceous material of the present invention for an electrode allows an electrochemical device having a high initial capacitance, a high effect of suppressing gas generation, and excellent durability to be obtained.

Description of Reference Signs

1: Electrode composition
2: Conductive adhesive
3: Etched aluminum foil
4: Tab
5: Sealant
6: Polarizable electrode
7: Bag-shaped exterior sheet
8: Electrochemical device
(1): Thermocompression-bonded side
(2): Side in contact with tabs
(3): Remaining side of bag-shaped exterior sheet

The invention claimed is:

1. A carbonaceous material having a BET specific surface area of 1550 to 2500 m²/g, a value of an oxygen content/

TABLE 2

| | Electrostatic capacitance per mass of carbonaceous material 25° C. (F/g) | | Electrostatic capacitance per mass of carbonaceous material −30° C. (F/g) | | Capacity retention rate 25° C. (%) | Capacity retention rate −30° C. (%) | Gas generation amoun (cc/g) |
|---|---|---|---|---|---|---|---|
| | 0 h Before durability test | 600 h After durability test | 0 h Before durability test | 600 h After durability test | 600 h After durability test | 600 h After durability test | 600 h After durability test |
| Example 1 | 29.0 | 21.0 | 28.9 | 17.6 | 72.3 | 60.9 | 15.5 |
| Comp. Example 1 | 29.0 | 19.1 | 29.2 | 14.5 | 65.9 | 49.7 | 24.8 |
| Comp. Example 2 | 29.3 | 20.0 | 29.0 | 15.7 | 68.3 | 54.0 | 32.9 |
| Comp. Example 3 | 27.7 | 20.0 | 27.6 | 18.9 | 72.3 | 68.2 | 17.5 |
| Comp. Example 4 | 26.8 | 21.2 | 26.6 | 19.4 | 79.1 | 72.7 | 16.7 |
| Example 2 | 28.3 | 23.0 | 28.1 | 21.1 | 81.3 | 75.1 | 12.8 |
| Example 3 | 31.7 | 22.3 | 31.2 | 19.0 | 70.3 | 60.9 | 15.2 |
| Comp. Example 5 | 27.5 | 16.4 | 27.5 | 11.1 | 59.6 | 40.4 | 22.8 |
| Comp. Example 6 | 27.9 | 17.6 | 27.7 | 15.3 | 63.1 | 55.2 | 17.1 |
| Comp. Example 7 | 26.2 | 20.0 | 25.9 | 16.9 | 76.3 | 65.3 | 14.1 |
| Comp. Example 8 | 24.9 | 20.2 | 24.1 | 16.9 | 81.1 | 70.1 | 15.0 |
| Comp. Example 9 | 32.0 | 20.6 | 32.0 | 17.1 | 64.4 | 53.4 | 25.5 |

As shown in Table 2, in Examples 1 to 3, it is shown that the electrochemical devices prepared by using the polarizable electrodes (1), (6), (7) containing the carbonaceous material of the present invention, respectively, have a high initial electrostatic capacitance, and also capability of suppressing the gas generation amount while retaining the initial electrostatic capacity, compared with the electrochemical devices prepared by using the carbonaceous materials (2) to (5), (8) to (12) of Comparative Examples 1 to 9, respectively.

It was shown that the electrochemical device of the present invention suppressed a decrease in the initial elechydrogen content per specific surface area of 1.00 to 2.10 mg/m², and an electrical conductivity of 10 to 15 S/cm determined by powder resistance measurement at a load of 12 kN.

2. The carbonaceous material according to claim 1, the carbonaceous material having a value of an oxygen content/hydrogen content of 2.0 to 4.3.

3. The carbonaceous material according to claim 1, wherein the carbonaceous material is based on a carbon precursor derived from a plant.

4. The carbonaceous material according to claim 3, wherein the carbon precursor is derived from a coconut shell.

5. An electrode active material formed from the carbonaceous material according to claim 1.

6. An electrode, comprising:
the electrode active material according to claim 5.

7. An electrochemical device, comprising:
the electrode according to claim 6.

8. A method for producing the carbonaceous material according to claim 1, the method comprising:
- a heating step of heating a carbonaceous material precursor to a first temperature of 330° C. or higher under a first oxidizing gas atmosphere;
- an acid washing step of washing the carbonaceous material precursor with a washing liquid containing an acid;
- a deacidification step of heating the carbonaceous material precursor after the acid washing to a second temperature of 330° C. or higher under a second oxidizing gas atmosphere; and
- a temperature lowering step of lowering a temperature of the carbonaceous material precursor under a non-oxidizing gas atmosphere after the deacidification,
- wherein the carbonaceous material precursor used for the deacidification step has an electrical conductivity of 11 to 16 S/cm determined by powder resistance measurement at a load of 12 kN.

9. The method according to claim 8, wherein the temperature of the carbonaceous material precursor is lowered to 200° C. or lower in the temperature lowering step.

* * * * *